US012682125B2

(12) United States Patent
Ku et al.

(10) Patent No.: US 12,682,125 B2
(45) Date of Patent: Jul. 14, 2026

(54) METHOD FOR PERFORMING SYSTEM TASK IN UNPRIVILEGED MODE AND ASSOCIATED ELECTRONIC DEVICE

(71) Applicant: MEDIATEK INC., Hsin-Chu (TW)

(72) Inventors: Chia-Yu Ku, Hsinchu City (TW); Tien-Fu Chang, Hsinchu City (TW); Fu-Shing Ju, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 124 days.

(21) Appl. No.: 18/510,681

(22) Filed: Nov. 16, 2023

(65) Prior Publication Data

US 2025/0165655 A1     May 22, 2025

(51) Int. Cl.
*G06F 21/74*     (2013.01)
*G06F 21/54*     (2013.01)
*G06F 21/60*     (2013.01)

(52) U.S. Cl.
CPC .............. *G06F 21/74* (2013.01); *G06F 21/54* (2013.01); *G06F 21/602* (2013.01)

(58) Field of Classification Search
CPC ......... G06F 21/74; G06F 21/54; G06F 21/602
See application file for complete search history.

(56) References Cited

U.S. PATENT DOCUMENTS 6,931,546 B1     8/2005 Kouznetsov et al.
8,874,866 B1 * 10/2014 Tyson ................. G06F 12/1466
707/E17.036

2006/0288235 A1 * 12/2006 Goto ................... G06F 12/1491
713/190
2007/0204085 A1 * 8/2007 Orlando ................. G06F 21/74
710/261
2009/0172329 A1 * 7/2009 Paver ................. G06F 12/1491
711/E12.091
2017/0337384 A1 * 11/2017 Willemse .............. H04L 9/3213
2022/0222337 A1 * 7/2022 Doshi ..................... G06F 21/53
2023/0161709 A1 * 5/2023 Wang ................. G06F 12/0891
711/135
2024/0303205 A1 * 9/2024 Asanovic ................ G06F 21/74
2024/0354447 A1 * 10/2024 Galles ..................... G06F 21/54

FOREIGN PATENT DOCUMENTS

JP     2017-511941 A     4/2017
JP     2017-513113 A     5/2017
TW       201715434 A     5/2017

* cited by examiner

*Primary Examiner* — Theodore C Parsons
*Assistant Examiner* — Alan L Kong
(74) *Attorney, Agent, or Firm* — Winston Hsu

(57) ABSTRACT

An electronic device includes a processor and a hardware component. The processor is arranged to utilize an instruction set architecture (ISA) to transmit a first request with a first verification key to a hardware component, for requesting the hardware component to execute a system task in an unprivileged mode, wherein the ISA corresponds to the hardware component, and the system task requests to access a target hardware address. The hardware component is arranged to determine whether to access the target hardware address according to the first verification key.

16 Claims, 4 Drawing Sheets

METHOD FOR PERFORMING SYSTEM TASK IN UNPRIVILEGED MODE AND ASSOCIATED ELECTRONIC DEVICE

BACKGROUND

The present invention is related to switching between a privileged mode and an unprivileged mode, and more particularly, to a method for executing a system task in the unprivileged mode and an associated electronic device.

For a software stack running on a processor of an electronic device, switching between a privileged mode and an unprivileged mode can provide protection for different components of the software stack. In the privileged mode, all resources of the software stack and the protected memory regions can be accessed. For example, a system task can be run in the privileged mode. In the unprivileged mode, some system regions and protected memory regions are restricted from being accessed. For example, hardware, a kernel, an operating system (OS), and an OS driver are prevented from being accessed. Considering robustness and security of the electronic device, user programs need to run in the unprivileged mode to prevent some malicious user programs. Some problems may occur, however. Under a condition that the processor is initially in the privileged mode and a plurality of user programs are required to be executed, when each of the plurality of user programs starts to be executed, it is required to switch from the privileged mode to the unprivileged mode. After the each of the plurality of user programs is executed, it is required to switch back to the privileged mode for executing the system task, which may cause latency. For a conventional method, the plurality of user programs to be executed will be combined into a combined user program, however, not all user programs are capable of being combined, and the design flexibility may be limited. In addition, the execution of the combined user program may reduce the overall performance. As a result, a novel method and an associated electronic device than can execute the system task in the unprivileged mode are urgently needed, to reduce the number of mode switching.

SUMMARY

It is therefore one of the objectives of the present invention to provide a method for executing a system task in an unprivileged mode and an associated electronic device, to address the above-mentioned issues.

According to an embodiment of the present invention, an electronic device is provided. The electronic device comprises a processor and a hardware component. The processor is arranged to utilize an instruction set architecture (ISA) to transmit a first request with a first verification key to a hardware component, for requesting the hardware component to execute a system task in an unprivileged mode, wherein the ISA corresponds to the hardware component, and the system task requests to access a target hardware address. The hardware component is arranged to determine whether to access the target hardware address according to the first verification key.

According to an embodiment of the present invention, a method for executing a system task in an unprivileged mode is provided. The method comprises: utilizing, by a processor, an ISA to transmit a first request with a first verification key to a hardware component, for requesting the hardware component to execute the system task in the unprivileged mode, wherein the ISA corresponds to the hardware component, and the system task requests to access a target hardware address; and determine, by the hardware component, whether to access the target hardware address according to the first verification key.

One of the benefits of the present invention is that, by comparing the verification key read from the target hardware address and the verification key obtained from the processor, the system task can be executed in the unprivileged mode. In this way, by a configuration of the hardware component, the ISA, and the verification keys, the number of switching between the privileged mode and the unprivileged mode can be reduced, which can greatly improve the latency caused by the mode switching. In addition, the security and the robustness of the electronic device can be ensured.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
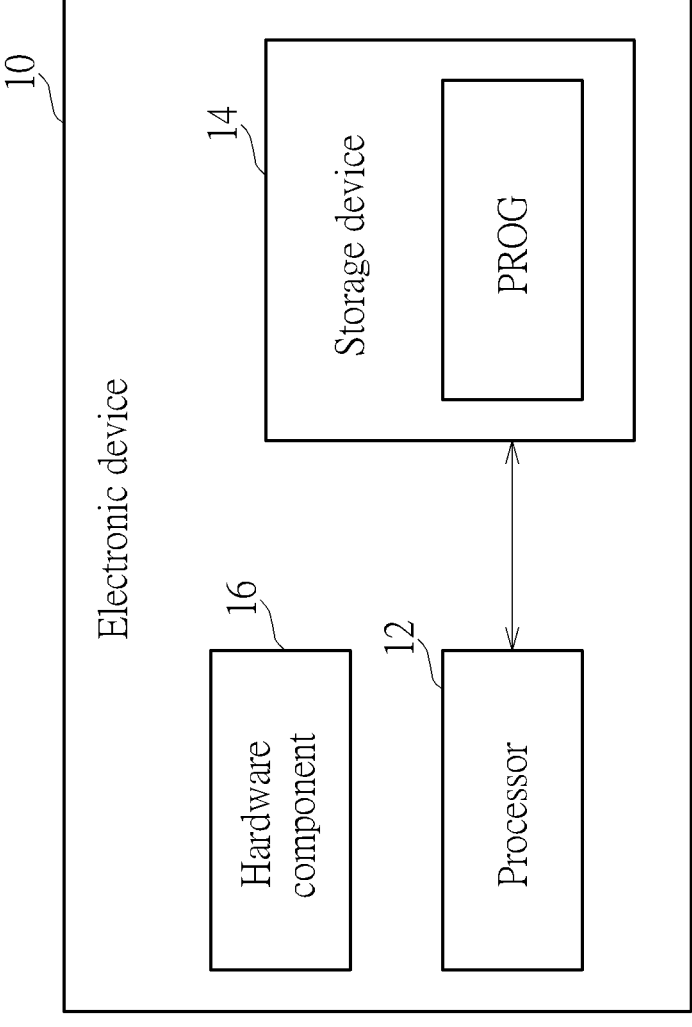
FIG. 1 is a diagram illustrating an electronic device according to an embodiment of the present invention.

FIG. 1 is a diagram illustrating an electronic device 10 according to an embodiment of the present invention. By way of example, but not limitation, the electronic device 10 may be a portable device such as a smartphone or a tablet. The electronic device 10 may include a processor 12, a storage device 14, and a hardware component 16, wherein the hardware component 16 may include circuits arranged to generate a key requested by the processor 12 for verification of a system task. The processor 12 may be a single-core processor or a multi-core processor. The storage device 14 is a non-transitory machine-readable medium, and is arranged to store computer program code PROG. The processor 12 is equipped with software execution capability. When loaded and executed by the processor 12, the computer program code PROG instructs the processor 12 to perform super-loop architecture and the method proposed by the present invention. The electronic device 10 may be regarded as a computer system using a computer program product that includes a computer-readable medium containing the computer program code PROG. That is, the method of the present invention may be embodied on the electronic device 10.

The super-loop architecture may include an infinite loop. After the processor 12 is powered on, a main function of the super-loop starts to be executed, an initialization is performed, and the infinite loop is entered. The infinite loop may include 4 Steps S100, S102, S104, and S106.

In Step S100, a current status of the processor 12 is checked. For example, it is checked that whether there is any user program to be executed.

In Step S102, in response to there being a user program to be executed, the user program is started to be executed by the processor 12.

In Step S104, after the user program is executed, a completion response is returned to a user.

In Step S106, some hardware values that are modified due to execution of the user program are recovered to original values, and Step S100 is returned.

The above operations can be expressed by the following pseudo code.

```
Function Main_Function( )
{
    Initialization( );
    Do Forever
    {
        Check_Status( );
        Do_User_Code( );
        Output_Response ( );
        House_Keeping( );
    }
}
```

Figure 2:
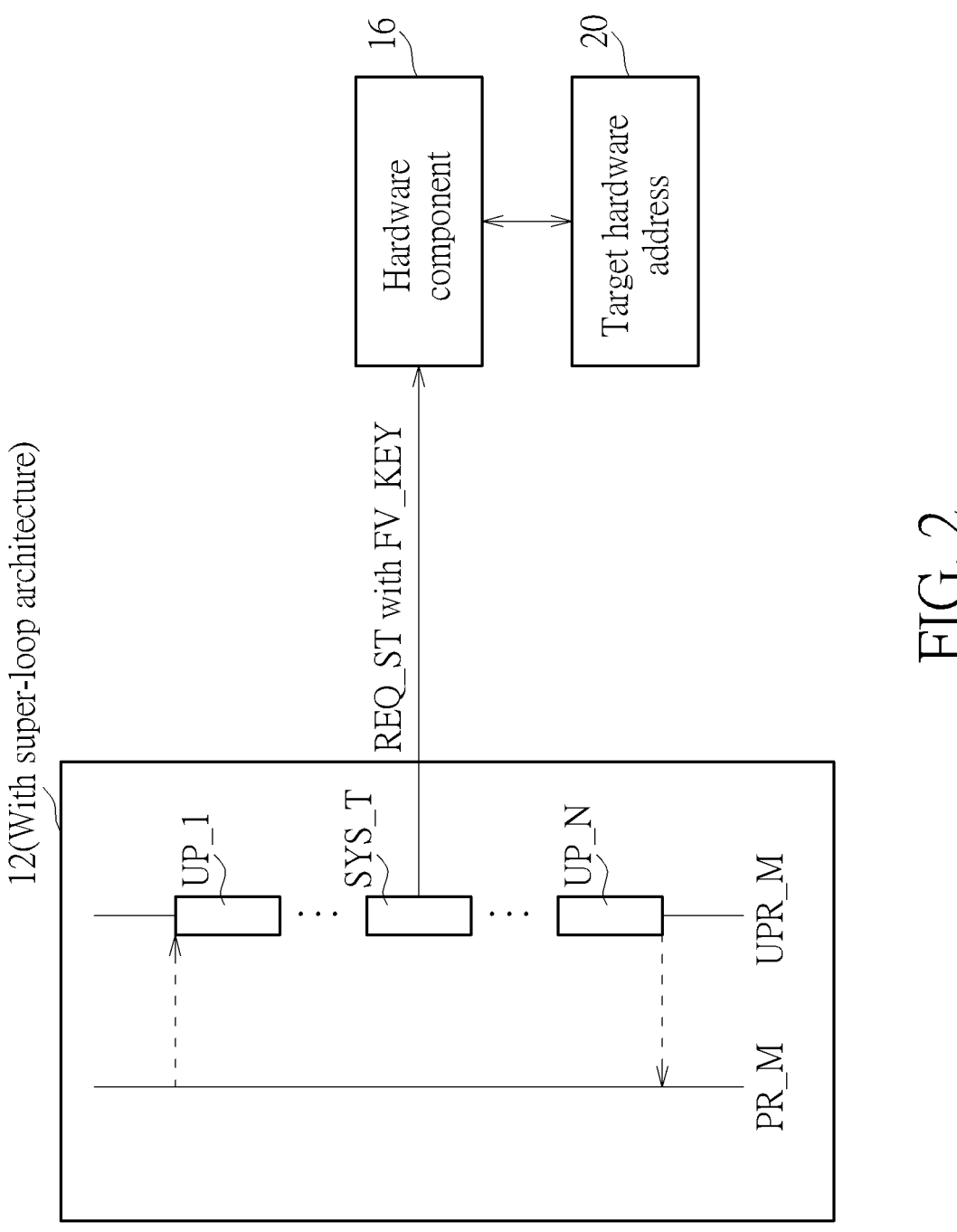
FIG. 2 is a diagram illustrating a processor with super-loop architecture where a system task is executed in an unprivileged mode according to an embodiment of the present invention.

FIG. 2 is a diagram illustrating the processor 12 with super-loop architecture where a system task SYS_T is executed in an unprivileged mode according to an embodiment of the present invention. As shown in FIG. 2, the processor 12 with super-loop architecture may be in a privileged mode PR_M or an unprivileged mode UPR_M, and may be arranged to execute a plurality of user programs UP_1-UP_N, wherein "N" is an integer greater than 1. The processor 12 is initially in the privileged mode PR_M. In response to the processor 12 starting to execute the user programs UP_1-UP_N, the processor 12 is switched from the privileged mode PR_M to the unprivileged mode UPR_M, and after a last user program (e.g. the user program UP_N) of the user programs UP_1-UP_N is executed, the processor 12 is switched from the unprivileged mode UPR_M to the privileged mode PR_M. That is, during the process of executing the user programs UP_1-UP_N, no matter whether there is the system task SYS_T to be executed, the processor 12 is maintained in the unprivileged mode UPR_M.

Figure 3:
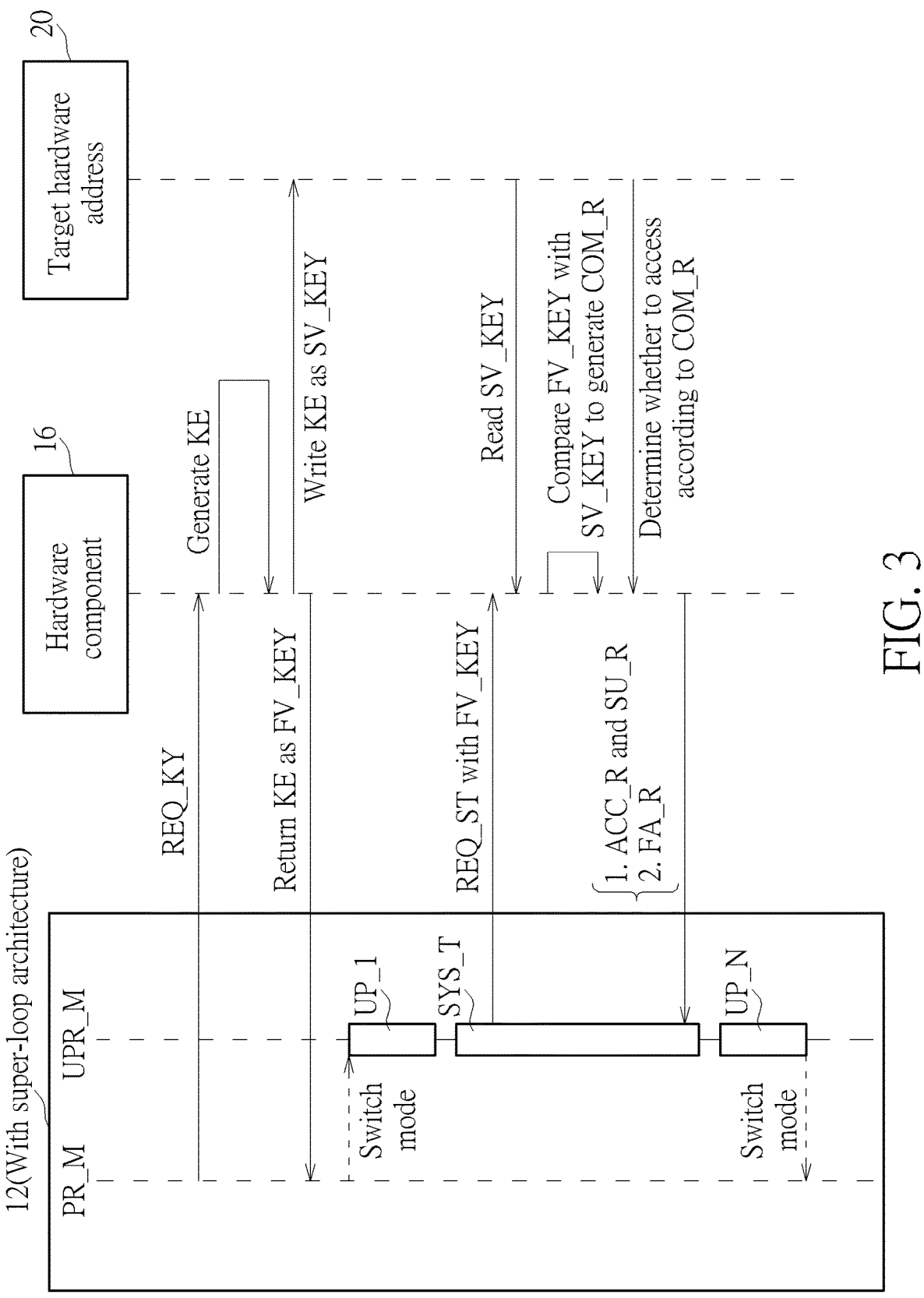
FIG. 3 is a diagram illustrating implementation details of switching between a privileged mode and an unprivileged mode according to an embodiment of the present invention.

In response to the execution of the system task SYS_T in the unprivileged mode UPR_M, the processor 12 may utilize an instruction set architecture (ISA) to transmit a request REQ_ST with a first verification key FV_KEY to the hardware component 16, for requesting the hardware component 16 to execute the system task SYS_T in the unprivileged mode UPR_M, wherein the ISA corresponds to the hardware component 16, and the system task SYS_T requests to access a target hardware address 20. After receiving the request REQ_ST, the hardware component 16 may be arranged to determine whether to access the target hardware address 20 according to the FIRST verification key FV_KEY. Specifically, please refer to FIG. 3. FIG. 3 is a diagram illustrating implementation details of switching between the privileged mode PR_M and the unprivileged mode UPR_M according to an embodiment of the present invention. As shown in FIG. 3, the processor 12 is initially in the privileged mode PR_M. In the privileged mode PR_M, the processor 12 may transmit a request REQ_KY to the hardware component 16 for requesting the hardware component 16 to generate a key KE. After generating the key KE, the hardware component 16 may be further arranged to write the key KE into the target hardware address 20 as a second verification key SV_KEY, and return the key KE to the processor 12. The processor 12 may store the key KE in a software stack running on the processor 12 as the first verification key FV_KEY.

Afterwards, the processor is switched from the privileged mode PR_M to the unprivileged mode UPR_M due to execution of the user programs UP_1-UP_N. In the unprivileged mode UPR_M, in response to the execution of the system task SYS_T, the processor 12 may transmit the request REQ_ST with the first verification key FV_KEY to the hardware component 16. The hardware component 16 may read the second verification key SV_KEY from the target hardware address 20, and compare the first verification key FV_KEY with the second verification key SV_KEY to generate a comparison result COM_R. In response to the comparison result COM_R indicating that the first verification key FV_KEY matches the second verification key SV_KEY, the hardware component 16 may determine to access the target hardware address 20 according to the request REQ_ST to generate an access result ACC_R, and transmit the access result ACC_R and a success response SU_R to the processor 12. In response to the comparison result COM_R indicating that the first verification key FV_KEY does not match the second verification key SV_KEY, the hardware component 16 may determine not to access the target hardware address 20, and transmit a failure response FA_R to the processor 12.

In this embodiment, by comparing the second verification key SV_KEY read from the target hardware address 20 and the first verification key FV_KET obtained from the processor 12, the system task SYS_T can be executed in the unprivileged mode UPR_M. By generating the key KE in the privileged mode PR_M and storing the key KE in the software stack and the target hardware address 20 as the first verification key FV_KEY and the second verification key SV_KEY, respectively, the derivation of the key KE can be regarded as an extension of the privilege, which can ensure the security of the execution of the system task SYS_T requesting to access the target hardware address 20 in the unprivileged mode UPR_M. It should be noted that every time the processor 12 is returned from the unprivileged mode UPR_M to the privileged mode PR_M, the processor 12 may request the hardware component 16 to regenerate the key KE, to make the key KE time-sensitive.

Figure 4:
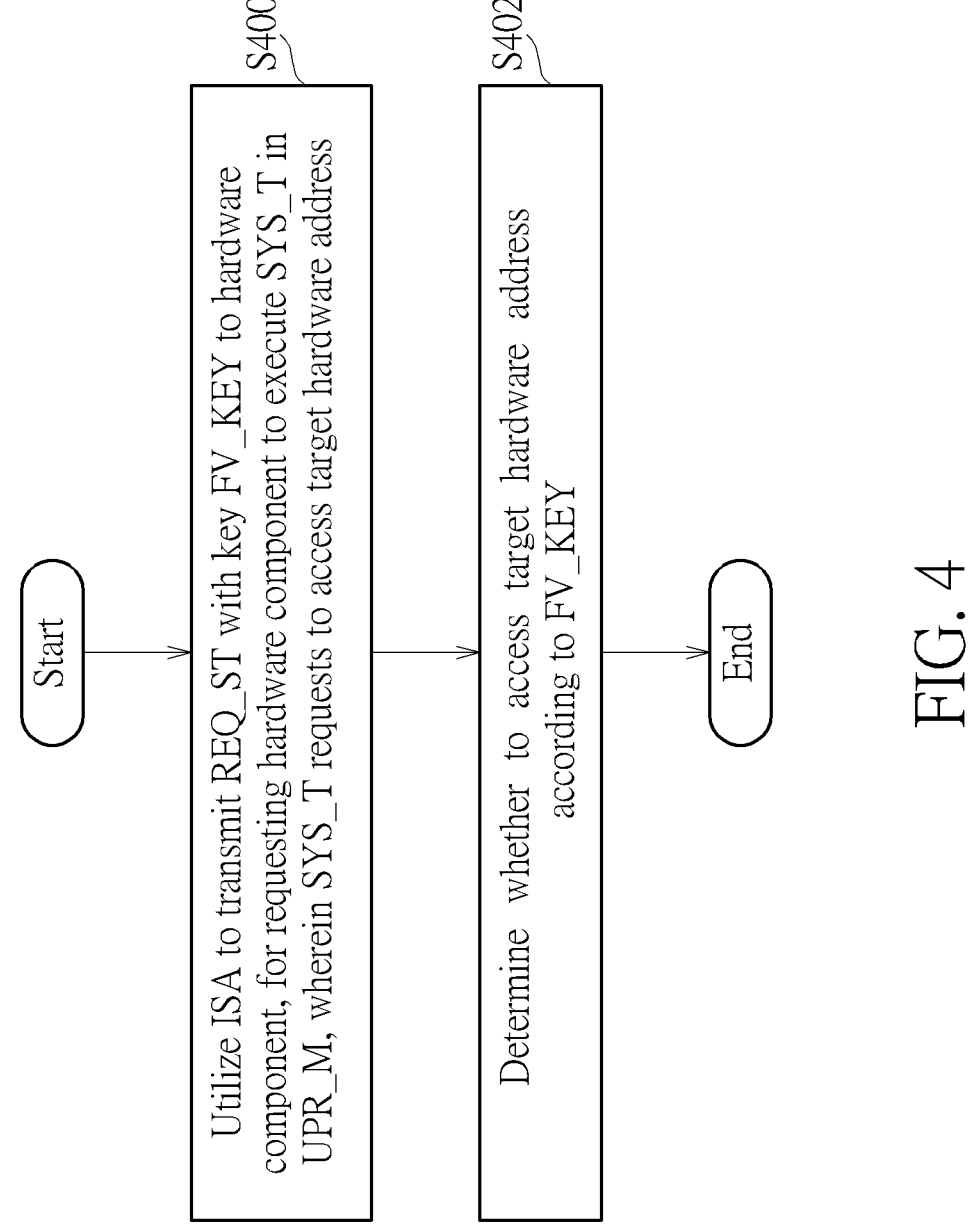
FIG. 4 is a flow chart of a method for executing a system task in an unprivileged mode according to an embodiment of the present invention.

FIG. 4 is a flow chart of a method for executing the system task SYS_T in the unprivileged mode UPR_M according to an embodiment of the present invention. Provided that the result is substantially the same, the steps are not required to be executed in the exact order shown in FIG. 4. For example, the method shown in FIG. 4 may be employed by the electronic device 10.

In Step S400, by the processor 12, the ISA is utilized to transmit the request REQ_ST with the first verification key FV_KEY to the hardware component 16, for requesting the hardware component 16 to execute the system task SYS_T in the unprivileged mode UPR_M, wherein the ISA corresponds to the hardware component 16, and the system task SYS_T requests to access the target hardware address 20.

In Step S402, by the hardware component 16, it is determined whether to access the target hardware address 20 according to the first verification key FV_KEY.

Since a person skilled in the pertinent art can readily understand details of the steps after reading above paragraphs, further descriptions are omitted here for brevity.

In summary, by comparing the second verification key SV_KEY read from the target hardware address 20 and the first verification key FV_KET obtained from the processor 12, the system task SYS_T can be executed in the unprivileged mode UPR_M. In this way, by a configuration of the hardware component 16, the ISA, and the verification keys (e.g., the first verification key FV_KET and the second verification key SV_KEY), the number of switching between the privileged mode PR_M and the unprivileged mode UPR_M can be reduced, which can greatly improve the latency caused by the mode switching. In addition, the security and the robustness of the electronic device 10 can be ensured.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
a processor, arranged to utilize an instruction set architecture (ISA) to transmit a first request with a first verification key to a hardware circuit, for requesting the hardware circuit to execute a system task in an unprivileged mode, wherein the ISA corresponds to the hardware circuit, the system task is associated with a privileged mode, and comprises operations of accessing a protected memory region; and when the processor is in the unprivileged mode, the processor is not capable of directly accessing the protected memory region; and
the hardware circuit, arranged to determine whether to execute the system task according to the first verification key, wherein the operations comprise requesting to access a target hardware address, and the target hardware address is associated with the protected memory region;
wherein in response to the processor being initially in the privileged mode, the processor transmits a second request to the hardware circuit for requesting the hardware circuit to generate a key; and the hardware circuit is further arranged to write the key into the target hardware address as a second verification key, and return the key to the processor as the first verification key;
wherein in response to the processor being returned from the unprivileged mode to the privileged mode, the processor requests the hardware circuit to regenerate the key.

2. The electronic device of claim 1, wherein the processor is initially in the privileged mode, and is further arranged to execute a plurality of user programs.

3. The electronic device of claim 2, wherein in response to the processor starting to execute the plurality of user programs, the processor is switched from the privileged mode to the unprivileged mode, and after a last user program of the plurality of user programs is executed, the processor is switched from the unprivileged mode to the privileged mode.

4. The electronic device of claim 1, wherein in response to the system task being executed in the unprivileged mode, the hardware circuit is further arranged to read the second verification key from the target hardware address, and compare the first verification key with the second verification key to generate a comparison result.

5. The electronic device of claim 4, wherein in response to the comparison result indicating that the first verification key matches the second verification key, the hardware circuit determines to access the target hardware address to generate an access result.

6. The electronic device of claim 5, wherein the hardware circuit transmits the access result and a success response to the processor.

7. The electronic device of claim 4, wherein in response to the comparison result indicating that the first verification key does not match the second verification key, the hardware circuit determines not to access the target hardware address.

8. The electronic device of claim 7, wherein the hardware circuit transmits a failure response to the processor.

9. A method for executing a system task in an unprivileged mode, wherein the system task is associated with a privileged mode, and comprises operations of accessing a protected memory region; and the method comprises:
utilizing, by a processor, an instruction set architecture (ISA) to transmit a first request with a first verification key to a hardware circuit, for requesting the hardware circuit to execute the system task in the unprivileged mode, wherein the ISA corresponds to the hardware circuit; and when the processor is in the unprivileged mode, the processor is not capable of directly accessing the protected memory region; and
determining, by the hardware circuit, whether to execute the system task according to the first verification key, wherein the operations comprise requesting to access a target hardware address, and the target hardware address is associated with the protected memory region;
wherein the method further comprises:
in response to the processor being initially in the privileged mode, transmitting, by the processor, a second request to the hardware circuit for requesting the hardware circuit to generate a key;
writing, by the hardware circuit, the key into the target hardware address as a second verification key;
returning, by the hardware circuit, the key to the processor as the first verification key; and
in response to the processor being returned from the unprivileged mode to the privileged mode, requesting, by the processor, the hardware circuit to regenerate the key.

10. The method of claim 9, wherein the processor is initially in the privileged mode, and the method further comprises:
executing, by the processor, a plurality of user programs.

11. The method of claim 10, wherein the step of executing, by the processor, the plurality of user programs comprises:
in response to the processor starting to execute the plurality of user programs, switching the processor from the privileged mode to the unprivileged mode; and
after a last user program of the plurality of user programs is executed, switching the processor from the unprivileged mode to the privileged mode.

12. The method of claim 9, further comprising:

in response to the system task being executed in the unprivileged mode, reading, by the hardware circuit, the second verification key from the target hardware address; and comparing, by the hardware circuit, the first verification key with the second verification key to generate a comparison result.

13. The method of claim 12, wherein the step of comparing, by the hardware circuit, the first verification key with the second verification key to generate the comparison result comprises:

in response to the comparison result indicating that the first verification key matches the second verification key, determining, by the hardware circuit, to access the target hardware address to generate an access result.

14. The method of claim 13, wherein the step of determining, by the hardware circuit, to access the target hardware address to generate the access result comprises:

transmitting, by the hardware circuit, the access result and a success response to the processor.

15. The method of claim 12, wherein the step of comparing, by the hardware circuit, the first verification key with the second verification key to generate the comparison result comprises:

in response to the comparison result indicating that the first verification key does not match the second verification key, determining, by the hardware circuit, not to access the target hardware address.

16. The method of claim 15, wherein the step of determining, by the hardware circuit, not to access the target hardware address comprises:

transmitting, by the hardware circuit, a failure response to the processor.

* * * * *